May 16, 1944.　　H. A. STAHL ET AL　　2,348,938
SKIMMING APPARATUS
Filed Jan. 30, 1941　　2 Sheets-Sheet 1
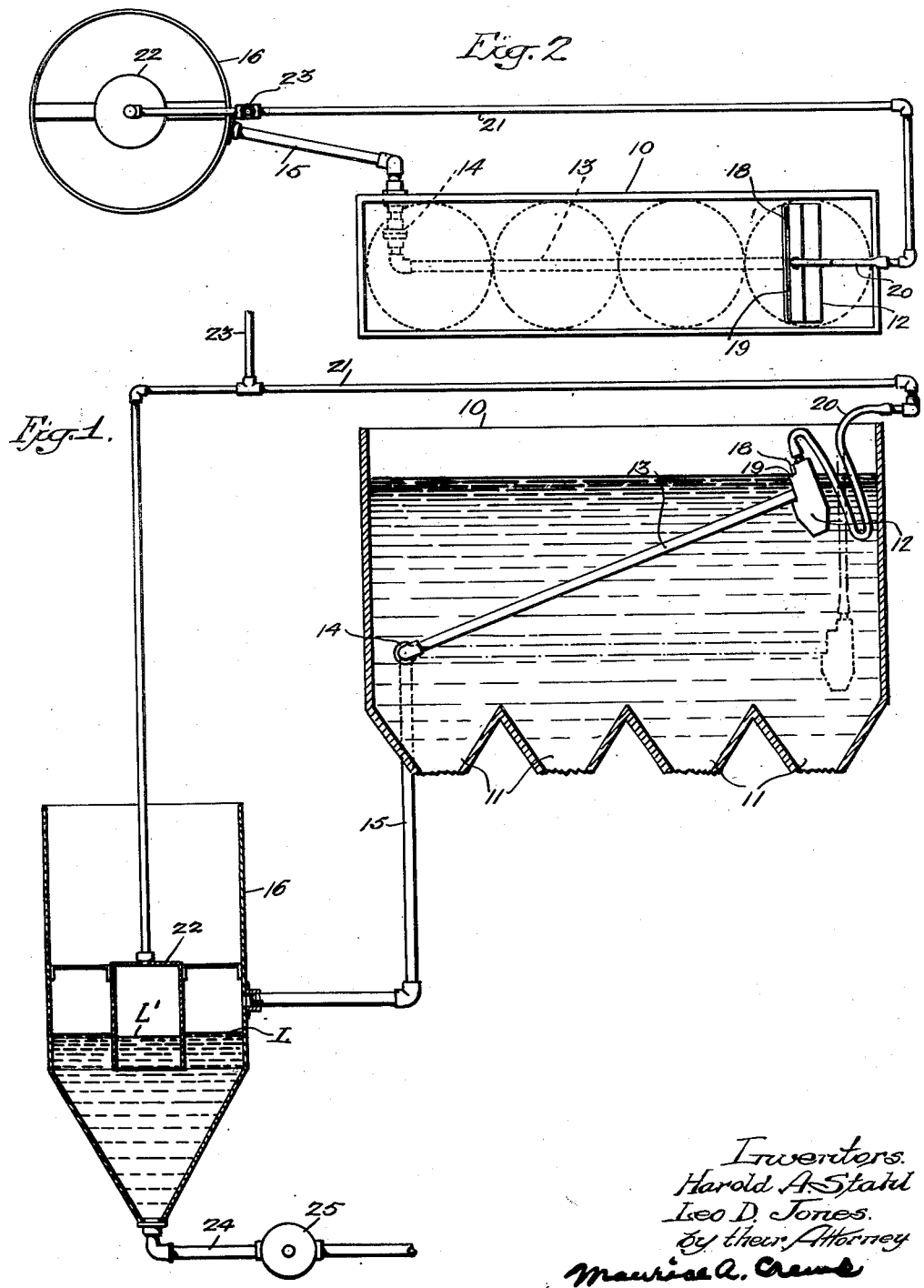

May 16, 1944.  H. A. STAHL ET AL  2,348,938
SKIMMING APPARATUS
Filed Jan. 30, 1941  2 Sheets-Sheet 2
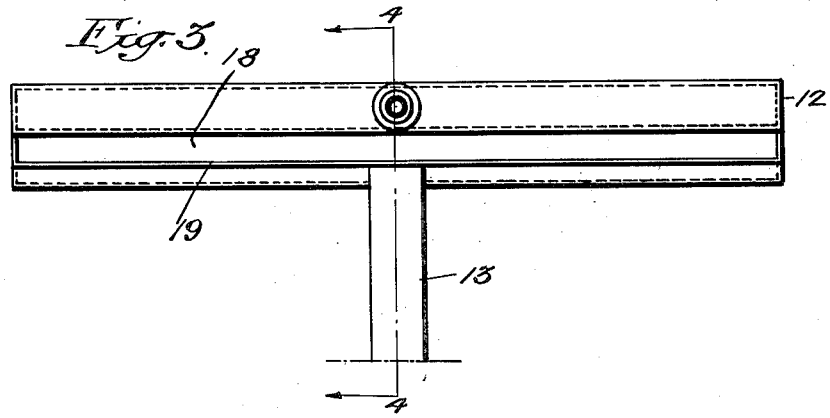
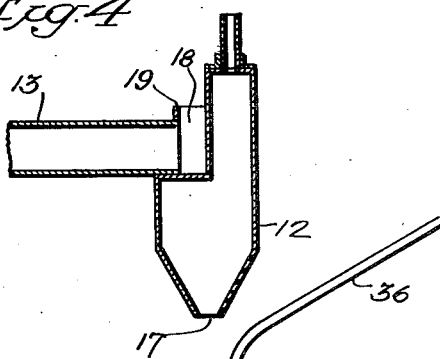
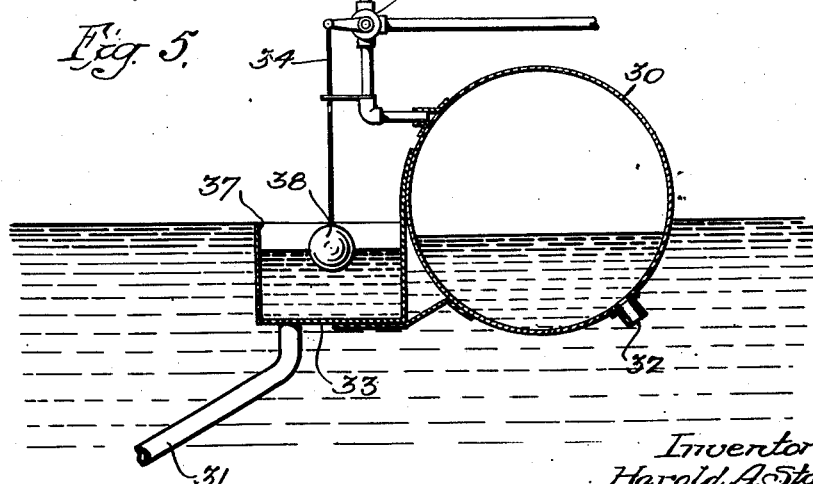
Inventors.
Harold A. Stahl,
Leo D. Jones.
by their Attorney Patented May 16, 1944

2,348,938

UNITED STATES PATENT OFFICE 2,348,938

SKIMMING APPARATUS

Harold A. Stahl, Lansdowne, and Leo D. Jones, Philadelphia, Pa., assignors to The Sharples Corporation, Philadelphia, Pa., a corporation of Delaware Application January 30, 1941, Serial No. 376,596

8 Claims. (Cl. 210—51)

The present invention pertains to the art of skimming liquids from the surface of a tank in which they are contained. It was conceived as a solution of problems arising in connection with the separation of solids in a gravity settling tank from a mixture of aqueous detergent solution and grease obtained from a wool scouring bath, and the object and nature of the invention may probably best be illustrated by a discussion of these problems.

In passing a mixture of detergent solution, grease and insoluble solids from a wool scouring bath to a centrifugal separator for separating the mixture into its constituents, it is desirable that at least a part of the dirt be first removed by gravity settling before the mixture is passed to the centrifugal separator. The mixture is therefore passed from the scouring bath to a gravity settling tank and from the gravity settling tank to the centrifugal separator. The conventional method of removing the mixture of aqueous phase and grease from the gravity settling tank to pass it to the centrifugal separator consists in the use of a swinging arm which is secured to a float in the settling tank. The liquid may pass through the skimming arm to a separate chamber or container which contains a column of the liquid balanced against the liquid in the swinging arm. In such an arrangement, as liquid is withdrawn from the chamber containing the balancing liquid column, liquid in the swinging arm descends and is replaced by liquid passing from the settling tank into the swinging arm.

In another form of apparatus in accordance with the prior art, liquid is passed from the skimming arm directly to a centrifugal, without passing first to a balancing column of liquid. In such case, however, the cross-section of the liquid passage through the swinging arm or associated conduit is restricted to prevent too rapid passage of the liquid to the centrifugal. This arrangement, like the balancing column of liquid, operates on the principle of maintaining the skimming arm full of liquid during normal operation by providing a flow restriction on the down-stream side of the skimming apparatus.

The arrangements described above give satisfactory results in cases in which the liquid phase of the material subjected to the settling operation is homogeneous. When a mixture of liquids, such as the mixture of oil and aqueous phase received from the scouring baths, is treated in such an apparatus, however, difficulty is encountered in withdrawing from the settling tank a mixture of liquids in substantially the same proportions as the mixture fed to the settling tank. In the treatment of our oil and grease mixture used for an illustration, a part of the grease rises to the surface, and the skimming arm has a tendency to suck the aqueous phase from beneath the layer of grease, leaving the supernatant and accumulating layer of grease in the settling tank.

Upon analysis of the problem, the applicants concluded that the reason for the objectionable phenomenon of removal of aqueous phase without removal of grease could be attributed to the low velocity of flow of liquid from the settling tank into the skimming arm, this velocity not being sufficiently great to draw the grease into the skimming arm along with the aqueous phase. Having appreciated the nature of the problem, the applicants have succeeded in solving it by devising an arrangement which prevents the flow of liquid into the swinging arm from being limited by a restriction down-stream. The liquid thus undergoes a substantial and sudden drop in passing from the settling tank into the skimming arm, with the result that the grease is carried along with the aqueous phase into the swinging arm, and that no grease layer accumulates on the upper surface of the settling tank.

As indicated above, the object of the invention has been to provide an arrangement by which liquid can be drawn at a controlled rate from a container, with a sudden drop of the liquid as it is withdrawn from the main body of the container into the skimming arm or other floating skimming apparatus, thereby avoiding retention of a stratified layer of lighter liquid in the container.

Further objects of the invention and the manner in which they have been attained will be evident from a reading of the following detailed description in the light of the attached drawings, in which, Figure 1 is a side elevation, partly in section, illustrating a settling tank, floating skimming member and supplemental skimming member controlling tank embodying the features of the invention, Figure 2 is a plan view of the skimming tank, controlling tank, and connections between these tanks, Figure 3 is a plan view of the weir box and float and associated parts of the invention.

Figure 4 is a cross-section on the line 4—4 of Figure 3, and

Figure 5 is a diagrammatic view illustrating a detail of an alternative embodiment of the invention.

The invention is illustrated in the drawings as applied to a settling or storage tank 10 having conical chambers 11 on its under side to receive deposited solids. A float 12 is mounted on a skimming arm 13 which is pivoted at 14 and connected through the pivotal connection 14 to a conduit 15 by which liquid skimmed from the surface of the tank 10 is passed into a supplemental chamber 16. The float 12 is provided with an opening 17 in its under side, and liquid from the skimming tank may enter the float through this opening.

During the course of the settling operation, the float 12 and associated skimming arm 13 may swing through a fairly wide arc, as indicated by the full line and dotted line positions, respectively, of Figure 1 of the drawings. A weir box 18 is secured to the upper part of the float 12 and includes a weir 19 across which the liquid flows in passing from the surface of liquid in the tank 10 into the swinging arm 13.

An air conduit, which may consist of a rubber hose connection 20, is secured to the closed upper end of the float 12, and this conduit is connected by means of piping 21 to a container 22 which is held in inverted position above the liquid in the bottom part of the chamber 16, and which will accordingly be referred to hereinafter as a "bell." A discharge conduit 24 is secured to the bottom part of the chamber 16, and a pump 25 may be provided to remove liquid through the conduit 24 from that chamber. A feeder conduit 23 communicates with the conduit 21 and serves to admit air under pressure through a throttle valve into the conduit 21 in order to replace air which may be lost from the system.

In the operation of the apparatus, when liquid is fed to the tank 10, and rises in this tank, a part of this liquid will enter the float 12 through the opening 17 in the bottom of the float, and the weir 19 will accordingly be held below the surface of the liquid in the tank. Liquid will accordingly flow across the weir 19 into the skimming arm 13 and will drop through this arm and the conduit 15 into the supplemental chamber 16. As the liquid rises in the chamber 16, the surface L of this liquid will extend upwardly beyond the lower end of the bell 22, with the result that the air in the interior of the bell 22 and associated conduits 20 and 21 will be compressed. As the super-atmospheric pressure on the interior of the bell 22 and in the conduits 20 and 21 increases, the level L of the liquid in the chamber 16 surrounding the bell will be higher than the level L' within the bell, this difference in level being proportional to the pressure. As the pressure in the bell 22 and conduits 20 and 21 increases, air will be forced into the upper end of the float 12, with the result that a part of the liquid will be forced out of this float through the opening 17 in the bottom of the float. This forcing of liquid out of the float will cause it to rise and carry the weir 19 upwardly to a point at which liquid no longer flows across this weir into the skimming arm 13 and chamber 16. As liquid is withdrawn from the chamber 16 through conduit 24 by pump 25, the pressure on the interior of the bell and in conduits 20 and 21 will again diminish, with the result that liquid will re-enter float 12 through opening 17, causing this float to again descend in the body of liquid in the container 10 until the weir 19 is below the surface of liquid in the container 10, and the skimming operation will be resumed when this occurs.

From the above discussion it will be seen that the invention provides an arrangement by which the skimming of liquid from the container 10 is correlated with the rate of passage of liquid through the conduit 24 from the container 10 and chamber 16, but that liquid does not accumulate in the skimming arm 13 as in the prior art, but passes swiftly to a lower level, thereby enabling the skimming member 19 to act as a true weir across which the liquid drops swiftly into skimming arm 13 to a level much lower than the level of liquid in the container 10. As the result of this swift drop of the liquid, the objectionable phenomenon of retention of a lighter stratum of liquid in the container 10 is entirely avoided.

An alternative form of the invention is illustrated in Figure 5 of the drawings. In this form of the invention, a float 30 is secured to a swinging arm 31, and an opening 32 is formed in the under side of the float to permit entry of water into the float in the same manner as discussed above in connection with the embodiment of Figures 1 to 3 of the drawings.

A weir box 33 is secured to the float 30, and the weir box 33 is made sufficiently large to constitute a supplemental chamber which fulfills a function similar to that of the chamber 16 of the embodiment of Figures 1 to 3. A float 38 is mounted in the supplemental chamber or weir box 33 and is secured by a connection 34 to a three-way valve 35 which controls the admission of air from a conduit 36 into the upper end of the float 30. As in the embodiment of Figures 1 to 3 of the drawings, liquid flows across a weir 37 from the main body of liquid in the container (not shown) corresponding to the container 10 of Figure 1 of the drawings. In the operation of this device, the valve 35 is maintained in communication with the atmosphere during the normal operation of skimming liquid across the weir 37 into the weir box 33. In case the liquid skimmed across the weir 37 is accumulated in the weir box 33 at a faster rate than the removal of liquid from this weir box, the level of liquid in the weir box 33 will rise, and this level, operating through the float 38 and connection 34 will ultimately actuate the valve 35 to move it to a position in which air under pressure is admitted through conduit 36 into the upper end of float 30. This will cause a part of the liquid in the bottom of the float 30 to be expelled through the opening 32, with the result that the float 30 will become more buoyant and will rise to a point at which the weir 37 is above the liquid level line of the tank. This weir will be held in this elevated position by the buoyancy of the float 30 until sufficient liquid is withdrawn from the supplemental chamber or arm to cause the level of liquid in the weir box 33 to recede to such point as to cause the float 38, operating through the connection 34, to move the valve 35 to a position in which air is released from the upper part of float 30. When this occurs, liquid again enters the float 30 through opening 32, causing this float to descend and drawing the weir 37 into a position below the surface of liquid in the tank.

It will be seen that, in the embodiment of Figure 5 of the drawings, as in the embodiment of Figures 1 to 3, the invention provides an arrangement by which liquid passing from the tank across the weir undergoes a substantial drop, thereby insuring that the lighter, as well as the heavier, liquid will be skimmed from the tank.

It will be seen from the above discussion that the fundamental features of the invention consist in the following steps. Means are provided for skimming liquid over a weir from the surface of liquid in a container. The liquid is passed to a separate container. The level of the weir in the liquid in the first container is controlled by the quantity of liquid in the second container. Thus, if the quantity of liquid in the second container becomes too great, by reason of failure to withdraw liquid from this second container as fast as it is passed to the second container from the first container, the weir will automatically be moved upwardly in the first container to lift the upper edge of the weir above the level of liquid in the first container, or at least to decrease the degree of immersion of the weir. If, on the other hand, the level of liquid in the second container descends, the weir will be moved downwardly in the first container to cause liquid from the first container to be withdrawn across the weir into the second container.

Still further modifications will be obvious to those skilled in the art, and we do not therefore wish to be limited except by the scope of the following claims.

We claim:

1. In an apparatus for skimming liquid from the surface of liquid in a container, a weir mounted for immersion beneath the surface of said liquid and for upward and downward movement in said container, a supplemental chamber mounted in position to receive liquid discharged over said weir, means for directing liquid discharged over said weir into said supplemental chamber, fluid actuated means connected with said weir to effect upward and downward movement of said weir in said container to change the vertical position of said weir relative to the surface of liquid in said container, a fluid conduit operatively connected to said weir actuating means, and means responsive to accumulation of liquid in said supplemental chamber for increasing the fluid pressure in said conduit and effecting the operation of said means for changing the position of said weir upwardly relative to said liquid surface upon accumulation of liquid beyond a predetermined amount in said supplemental chamber.

2. In an apparatus for skimming liquid from the surface of liquid in a container, a weir mounted for immersion beneath the surface of liquid and for vertical movement in said container, a float having an opening in its lower end secured to said weir, a second container mounted in position to receive liquid discharged over said weir, means for directing liquid discharged over said weir into said second container, a bell mounted in said second container in a position in which its open lower end is adapted to be immersed in liquid accumulating in said second container, and a pneumatic connection between the closed upper end of said bell and the upper portion of said float in said first container, whereby accumulation of liquid in said second container effects compression of air within said bell and forces said air from said pneumatic connection into said float and thereby expels liquid through the open lower end of said float to increase the buoyancy of said float.

3. In an apparatus for skimming liquid from the surface of liquid in a container, a weir mounted for immersion beneath the surface of said liquid and for vertical movement in said container, a supplemental chamber mounted in position to receive liquid discharged over said weir, means for directing liquid discharged over said weir into said supplemental chamber, operating means for effecting vertical movement of said weir, pneumatic means interconnecting said supplemental chamber with said operating means for effecting vertical movement of said weir, and means responsive to accumulation of liquid in said supplemental chamber beyond a predetermined amount for transmitting pressure energy through said pneumatic connection to said operating means, said operating means being controlled by transmission of said pressure energy for moving said weir upwardly relatively to the liquid surface in said container upon accumulation of liquid beyond a predetermined amount in said supplemental chamber.

4. In an apparatus for skimming liquid from the surface of liquid in a container, a weir mounted for immersion beneath the surface of said liquid and for vertical movement in said container, a float having an opening in its lower end secured to said weir, a second container mounted in position to receive liquid discharged over said weir, means for directing liquid discharged over said weir into said second container, pneumatic means interconnecting said second container with said float and means responsive to accumulation of liquid in said second container beyond a predetermined amount for transmitting pressure through said pneumatic connection to said float, whereby gas is forced into said float to cause movement of said float and weir upwardly relative to the liquid surface in said first container upon the accumulation of liquid beyond a predetermined amount in said second container.

5. In an apparatus for skimming liquid from the surface of liquid in a container, a weir mounted for immersion beneath the surface of said liquid and for upward and downward movement in said container, a supplemental chamber rigidly associated with said weir and mounted to float within said container in position to receive liquid discharged over said weir, means connected to said supplemental chamber to effect vertical movement of said supplemental chamber and said weir in said container to change the upward and downward position of said weir relative to the surface of liquid in said container, a float in said supplemental chamber, and means actuated by said float in said supplemental chamber for controlling the operation of said means for changing the position of said weir relative to said liquid surface in said container, said supplemental chamber being provided with an outlet for discharge of skimmed liquid therefrom.

6. In an apparatus for skimming liquid from the surface of liquid in a container, a weir mounted for immersion beneath the surface of said liquid and for upward and downward movement in said container, a supplemental chamber rigidly connected with said weir and mounted to float within said container in position to receive liquid discharged over said weir, pneumatic means connected to said weir to effect vertical movement of said weir in said container to change the upward and downward position of said weir relative to the surface of liquid in said container, a float in said supplemental chamber, and means actuated by said float in said supplemental chamber for controlling the operation of said pneumatic means for changing the position of said weir relative to said liquid surface in said container, said supplemental chamber being provided with an outlet for discharge of skimmed liquid therefrom.

7. In an apparatus for skimming liquid from the surface of liquid in a container, the combination comprising a skimming arm comprising a conduit for discharging liquid from said container, a weir connected to said skimming arm for controlling the flow of liquid into said conduit and mounted for immersion beneath the surface of liquid in said container, a float having a hole in its under side and secured to said skimming arm and supporting said weir, a conduit connected to the upper portion of said float, and means rendered operative by liquid passing over said weir for varying the pressure of air in said conduit and the upper portion of said float to cause said float to move relatively to the level of liquid in said container.

8. In an apparatus for skimming liquid from the surface of liquid in a container, the combination comprising a skimming arm comprising a conduit for discharging liquid from said container, a weir connected to said skimming arm for controlling the flow of liquid into said conduit and mounted for immersion beneath the surface of liquid in said container, a float having a hole in its under side and secured to said skimming arm and supporting said weir, a conduit connected to the upper portion of said float, a receptacle mounted to receive liquid discharged over said weir, and means rendered operative by accumulation of liquid in said receptacle for varying the pressure of air in said conduit and the upper portion of said float to cause said float to rise relatively to the level of liquid in said container, said receptacle being provided with an outlet for discharge of skimmed liquid.

HAROLD A. STAHL.
LEO D. JONES.